(12) United States Patent
Ohsugi et al.

(10) Patent No.: US 10,759,377 B2
(45) Date of Patent: Sep. 1, 2020

(54) GAS GENERATOR

(71) Applicant: NIPPON KAYAKU KABUSHIKI KAISHA, Chiyoda-ku (JP)

(72) Inventors: Satoshi Ohsugi, Himeji (JP); Shinya Ueda, Himeji (JP); Haruki Takizawa, Himeji (JP)

(73) Assignee: NIPPON KAYAKU KABUSHIKI KAISHA, Chiyoda-ku (JP)

( * ) Notice: Subject to any disclaimer, the term of this patent is extended or adjusted under 35 U.S.C. 154(b) by 70 days.

(21) Appl. No.: 15/769,786

(22) PCT Filed: Oct. 21, 2016

(86) PCT No.: PCT/JP2016/081245
§ 371 (c)(1),
(2) Date: Apr. 20, 2018

(87) PCT Pub. No.: WO2017/069233
PCT Pub. Date: Apr. 27, 2017

(65) Prior Publication Data
US 2018/0312132 A1    Nov. 1, 2018

(30) Foreign Application Priority Data

Oct. 23, 2015  (JP) ................................. 2015-208899

(51) Int. Cl.
*B60R 21/264* (2006.01)
*B60R 21/203* (2006.01)
(Continued)

(52) U.S. Cl.
CPC .......... *B60R 21/264* (2013.01); *B60R 21/203* (2013.01); *B60R 21/261* (2013.01);
(Continued)

(58) Field of Classification Search
CPC ... B60R 21/264; B60R 21/261; B60R 21/203; B60R 2021/26076; B60R 2021/26029; B60R 21/217; B60R 21/2644
See application file for complete search history.

(56) References Cited

U.S. PATENT DOCUMENTS 5,193,846 A * 3/1993 Allard ................... B60R 21/217
                                                    280/728.2
5,219,178 A * 6/1993 Kobari ................ B60R 21/2644
                                                    280/732

(Continued)

FOREIGN PATENT DOCUMENTS

CN    1720158 A    1/2006
CN    1863695 A    11/2006
(Continued)

OTHER PUBLICATIONS

International Search Report dated Dec. 20, 2016 in PCT/JP2016/081245, filed on Oct. 21, 2016.
(Continued)

*Primary Examiner* — Paul N Dickson
*Assistant Examiner* — Timothy Wilhelm
(74) *Attorney, Agent, or Firm* — Oblon, McClelland, Maier & Neustadt, L.L.P.

(57) ABSTRACT

A gas generator includes a housing containing an accommodation space, a gas generating agent, an igniter, and a sealing tape. The housing includes a cylindrical circumferential wall portion including plural gas discharge openings and the plural gas discharge openings are closed by the sealing tape. The plural gas discharge openings include gas discharge openings set to be different from one another in opening pressure so as to be opened stepwise with increase in pressure in the accommodation space as a result of burning of the gas generating agent. A condition of T≤1.8 [mm] and SA≥60 [mm²] is satisfied where T represents a
(Continued)

thickness of a portion of the housing and SA represents a total opening area of the plurality of gas discharge openings. At least one of the plural gas discharge openings is in a shape of an elongated hole.

10 Claims, 8 Drawing Sheets

(51) Int. Cl.
*B60R 21/261* (2011.01)
*B60R 21/217* (2011.01)
*B60R 21/26* (2011.01)

(52) U.S. Cl.
CPC ........ *B60R 21/2644* (2013.01); *B60R 21/217* (2013.01); *B60R 2021/26029* (2013.01); *B60R 2021/26076* (2013.01)

(56) References Cited

U.S. PATENT DOCUMENTS

| | | | | |
|---|---|---|---|---|
| 6,491,321 | B1* | 12/2002 | Nakashima | B01D 46/24 102/530 |
| 6,547,275 | B2* | 4/2003 | Nakashima | B01D 46/24 280/736 |
| 6,648,371 | B2* | 11/2003 | Vendely | B60R 21/217 280/739 |
| 7,398,996 | B2* | 7/2008 | Saito | B60R 21/2644 280/741 |
| 7,520,530 | B2* | 4/2009 | Yamazaki | B60R 21/2644 280/736 |
| 7,578,522 | B2* | 8/2009 | Hanano | B60R 21/2644 102/531 |
| 7,722,078 | B2* | 5/2010 | Yamazaki | B60R 21/261 280/739 |
| 9,199,603 | B2* | 12/2015 | Ohsugi | B60R 21/2644 |
| 2001/0033075 | A1* | 10/2001 | Soderquist | B60R 21/26 280/736 |
| 2003/0160437 | A1* | 8/2003 | Ohji | B60R 21/2644 280/736 |
| 2007/0039508 | A1 | 2/2007 | Saito et al. | |
| 2007/0063494 | A1* | 3/2007 | Saito | B60R 21/2644 280/736 |
| 2007/0235988 | A1* | 10/2007 | Boyd | B60R 21/2037 280/728.2 |
| 2008/0143088 | A1 | 6/2008 | Yamazaki | |
| 2011/0101651 | A1* | 5/2011 | Bierwirth | F42B 3/04 280/728.2 |
| 2016/0016529 | A1 | 1/2016 | Bierwirth et al. | |
| 2017/0043742 | A1* | 2/2017 | Ueda | B60R 21/264 |
| 2017/0341617 | A1 | 11/2017 | Bierwirth et al. | |

FOREIGN PATENT DOCUMENTS

| | | |
|---|---|---|
| EP | 1 661 775 A1 | 5/2006 |
| JP | 7-257313 A | 10/1995 |
| JP | 8-1005 U | 6/1996 |
| JP | 2001-219810 A | 8/2001 |
| JP | 2008-149873 A | 7/2008 |
| JP | 2009-532649 A | 9/2009 |
| JP | 2015-143095 A | 8/2015 |
| WO | WO 031066384 A1 | 8/2003 |
| WO | WO 2010/037516 A2 | 4/2010 |

OTHER PUBLICATIONS

Extended European Search Report dated Feb. 20, 2019 in the corresponding European Application No. 16857546.2 5 pages.
Japanese Office Action dated Feb. 25, 2020 in Patent Application No. 2015-208899 (with English translation), 6 pages.
Combined Chinese Office Action and Search Report dated Nov. 27, 2019, in Patent Application No. 201680062036.X, 15 pages (with English translation and English Translation of Category of Cited Documents).

* cited by examiner (A)

FIRST EXAMPLE

| GAS GENERATOR | AMOUNT OF GAS GENERATION [mol] | | 2.0 |
|---|---|---|---|
| | THICKNESS T OF HOUSING [mm] | | 1.2 |
| | TOTAL WEIGHT [g] | | 320 |
| | THICKNESS t OF SEALING TAPE [mm] | | 0.11 |
| GAS DISCHARGE OPENING | TOTAL OPENING AREA SA [mm²] | | 115.55 |
| | FIRST GAS DISCHARGE OPENING (23a) | SHAPE | LONGITUDINALLY ELONGATED HOLE |
| | | THE NUMBER OF OPENINGS [COUNT] | 4 |
| | | LENGTH L1 [mm] | 4.6 |
| | | WIDTH W1 [mm] | 1.8 |
| | | OPENING AREA S1 [mm²] | 7.59 |
| | | SUM Sa1 OF OPENING AREAS [mm²] | 30.34 |
| | | RATIO Sa1/SA [-] | 0.26 |
| | | BREAKING PRESSURE (CALCULATED VALUE) P1 [Mpa] | 10.1 |
| | | SET RATIO P1/P3 [-] | 0.68 |
| | SECOND GAS DISCHARGE OPENING (23b) | SHAPE | LONGITUDINALLY ELONGATED HOLE |
| | | THE NUMBER OF OPENINGS [COUNT] | 8 |
| | | LENGTH L2 [mm] | 5.2 |
| | | WIDTH W2 [mm] | 1.2 |
| | | OPENING AREA S2 [mm²] | 5.93 |
| | | SUM Sa2 OF OPENING AREAS [mm²] | 47.45 |
| | | RATIO Sa2/SA [-] | 0.41 |
| | | BREAKING PRESSURE (CALCULATED VALUE) P2 [Mpa] | 13.5 |
| | | SET RATIO P2/P3 [-] | 0.91 |
| | THIRD GAS DISCHARGE OPENING (23c) | SHAPE | LONGITUDINALLY ELONGATED HOLE |
| | | THE NUMBER OF OPENINGS [COUNT] | 12 |
| | | LENGTH L3 [mm] | 2.7 |
| | | WIDTH W3 [mm] | 1.3 |
| | | OPENING AREA S3 [mm²] | 3.15 |
| | | SUM Sa3 OF OPENING AREAS [mm²] | 37.77 |
| | | RATIO Sa3/SA [-] | 0.33 |
| | | BREAKING PRESSURE (CALCULATED VALUE) P3 [Mpa] | 14.9 |
| MEASUREMENT RESULT | INTERNAL PRESSURE IN COMBUSTION CHAMBER IN LOW-TEMPERATURE ENVIRONMENT (ACTUALLY MEASURED VALUE) [MPa] | | 15.0 |

FIG.9

SECOND EXAMPLE

| | | | |
|---|---|---|---|
| GAS GENERATOR | AMOUNT OF GAS GENERATION [mol] | | 1.2 |
| | THICKNESS T OF HOUSING [mm] | | 1.2 |
| | TOTAL WEIGHT [g] | | 220 |
| | THICKNESS t OF SEALING TAPE [mm] | | 0.11 |
| GAS DISCHARGE OPENING | TOTAL OPENING AREA SA [mm$^2$] | | 80.64 |
| | FIRST GAS DISCHARGE OPENING (23a) | SHAPE | LATERALLY ELONGATED HOLE |
| | | THE NUMBER OF OPENINGS [COUNT] | 4 |
| | | LENGTH L1 [mm] | 2.0 |
| | | WIDTH W1 [mm] | 4.7 |
| | | OPENING AREA S1 [mm$^2$] | 8.54 |
| | | SUM Sa1 OF OPENING AREAS [mm$^2$] | 34.17 |
| | | RATIO Sa1/SA [-] | 0.42 |
| | | BREAKING PRESSURE (CALCULATED VALUE) P1 [Mpa] | 9.2 |
| | | SET RATIO P1/P3 [-] | 0.63 |
| | SECOND GAS DISCHARGE OPENING (23b) | SHAPE | LATERALLY ELONGATED HOLE |
| | | THE NUMBER OF OPENINGS [COUNT] | 4 |
| | | LENGTH L2 [mm] | 1.4 |
| | | WIDTH W2 [mm] | 4.4 |
| | | OPENING AREA S2 [mm$^2$] | 5.74 |
| | | SUM Sa2 OF OPENING AREAS [mm$^2$] | 22.96 |
| | | RATIO Sa2/SA [-] | 0.28 |
| | | BREAKING PRESSURE (CALCULATED VALUE) P2 [Mpa] | 12.2 |
| | | SET RATIO P2/P3 [-] | 0.83 |
| | THIRD GAS DISCHARGE OPENING (23c) | SHAPE | LATERALLY ELONGATED HOLE |
| | | THE NUMBER OF OPENINGS [COUNT] | 8 |
| | | LENGTH L3 [mm] | 1.4 |
| | | WIDTH W3 [mm] | 2.4 |
| | | OPENING AREA S3 [mm$^2$] | 2.94 |
| | | SUM Sa3 OF OPENING AREAS [mm$^2$] | 23.52 |
| | | RATIO Sa3/SA [-] | 0.29 |
| | | BREAKING PRESSURE (CALCULATED VALUE) P3 [Mpa] | 14.6 |
| MEASUREMENT RESULT | INTERNAL PRESSURE IN COMBUSTION CHAMBER IN LOW-TEMPERATURE ENVIRONMENT (ACTUALLY MEASURED VALUE) [MPa] | | 14.5 |

FIG.10

THIRD EXAMPLE

| | | | |
|---|---|---|---|
| GAS GENERATOR | AMOUNT OF GAS GENERATION [mol] | | 1.2 |
| | THICKNESS T OF HOUSING [mm] | | 1.2 |
| | TOTAL WEIGHT [g] | | 220 |
| | THICKNESS t OF SEALING TAPE [mm] | | 0.11 |
| GAS DISCHARGE OPENING | TOTAL OPENING AREA SA [mm²] | | 80.47 |
| | FIRST GAS DISCHARGE OPENING (23a) | SHAPE | LATERALLY ELONGATED HOLE |
| | | THE NUMBER OF OPENINGS [COUNT] | 4 |
| | | LENGTH L1 [mm] | 2.5 |
| | | WIDTH W1 [mm] | 3.6 |
| | | OPENING AREA S1 [mm²] | 7.66 |
| | | SUM Sa1 OF OPENING AREAS [mm²] | 30.63 |
| | | RATIO Sa1/SA [−] | 0.38 |
| | | BREAKING PRESSURE (CALCULATED VALUE)P1 [Mpa] | 8.8 |
| | | SET RATIO P1/P3 [−] | 0.60 |
| | SECOND GAS DISCHARGE OPENING (23b) | SHAPE | LATERALLY ELONGATED HOLE |
| | | THE NUMBER OF OPENINGS [COUNT] | 4 |
| | | LENGTH L2 [mm] | 1.4 |
| | | WIDTH W2 [mm] | 5.0 |
| | | OPENING AREA S2 [mm²] | 6.58 |
| | | SUM Sa2 OF OPENING AREAS [mm²] | 26.32 |
| | | RATIO Sa2/SA [−] | 0.33 |
| | | BREAKING PRESSURE (CALCULATED VALUE)P2 [Mpa] | 11.8 |
| | | SET RATIO P2/P3 [−] | 0.81 |
| | THIRD GAS DISCHARGE OPENING (23c) | SHAPE | LATERALLY ELONGATED HOLE |
| | | THE NUMBER OF OPENINGS [COUNT] | 8 |
| | | LENGTH L3 [mm] | 1.4 |
| | | WIDTH W3 [mm] | 2.4 |
| | | OPENING AREA S3 [mm²] | 2.94 |
| | | SUM Sa3 OF OPENING AREAS [mm²] | 23.52 |
| | | RATIO Sa3/SA [−] | 0.29 |
| | | BREAKING PRESSURE (CALCULATED VALUE)P3 [Mpa] | 14.6 |
| MEASUREMENT RESULT | INTERNAL PRESSURE IN COMBUSTION CHAMBER IN LOW-TEPERATURE ENVIRONMENT (ACTUALLY MEASURED VALUE) [MPa] | | 14.5 |

GAS GENERATOR

TECHNICAL FIELD

The present invention relates to a gas generator incorporated in a passenger protection apparatus which protects a driver and/or a passenger at the time of collision of a vehicle or the like, and particularly to a gas generator incorporated in an air bag apparatus equipped in a car.

BACKGROUND ART

From a point of view of protection of a driver and/or a passenger in a car, an air bag apparatus which is a passenger protection apparatus has conventionally widely been used. The air bag apparatus is equipped for the purpose of protecting a driver and/or a passenger against shock caused at the time of collision of a vehicle, and it receives a body of a driver or a passenger with an air bag serving as a cushion, as the air bag is expanded and developed instantaneously at the time of collision of the vehicle.

The gas generator is equipment which is incorporated in this air bag apparatus, an igniter therein being ignited in response to power feed through a control unit at the time of collision of a vehicle to thereby burn a gas generating agent with flame caused by the igniter and instantaneously generate a large amount of gas, and thus expands and develops an air bag.

Gas generators of various structures are available. A disc type gas generator of which outer geometry is in a substantially short columnar shape is available as a gas generator suitably used for an air bag apparatus on a driver's seat side, and a cylinder type gas generator of which outer geometry is in a substantially long columnar shape is available as a gas generator suitably used for a side air bag apparatus, a curtain air bag apparatus, an air bag apparatus on a passenger's seat side, and a knee air bag apparatus.

It is important for a gas generator to burn a gas generating agent continually in a stable manner at the time of activation of an igniter. In order to burn the gas generating agent continually in a stable manner, the gas generating agent should be placed in a prescribed high-pressure environment. Therefore, the gas generator is designed to narrow a plurality of gas discharge openings provided in the housing to a desired size so that a pressure in a space in the housing is raised to a considerable level at the time of activation of the igniter.

It is important for the gas generator to reliably achieve sealing of a space in the housing from an external space in order to prevent the gas generating agent accommodated in the housing or an enhancer agent loaded in the housing as necessary for burning the gas generating agent from absorbing moisture. If the gas generating agent or the enhancer agent absorbs moisture, desired output characteristics may not be obtained at the time of activation of the gas generator.

Therefore, such a construction has generally been adopted for a conventional gas generator that a gas discharge opening is narrowed to a necessary opening diameter so as to sufficiently raise a pressure in the space in the housing at the time of activation and a sealing tape made of a metal is applied to the housing so as to close the gas discharge opening (see, for example, Japanese Patent Laying-Open No. 2001-219810 (PTD 1)).

CITATION LIST

Patent Document

PTD 1: Japanese Patent Laying-Open No. 2001-219810

SUMMARY OF INVENTION

Technical Problem

Reduction in size and weight of a gas generator has strongly been demanded in recent years. In order to reduce a size of the gas generator, it is effective to decrease a thickness of a housing serving as a pressure-resistant container. When a thickness of the housing is simply made smaller, however, pressure-resistant performance of the housing cannot sufficiently be ensured. Therefore, in order to reduce a weight of the gas generator, it is essential to considerably lower a pressure in a space in the housing at the time of activation within a range in which a gas generating agent can be burnt continually in a stable manner.

Output characteristics of a gas generator are affected by an ambient environment where the gas generator is placed and they are particularly dependent on an ambient temperature. The output characteristics tend to be enhanced in a high-temperature environment and to be lowered in a low-temperature environment. Gas is issued earlier and stronger in the high-temperature environment, whereas gas is issued slower and weaker in the low-temperature environment.

Therefore, when a total opening area of a plurality of gas discharge openings is increased in order to lower a pressure in the space in the housing at the time of activation, it becomes difficult to sustain burning of the gas generating agent in a low-temperature environment and to ensure an operation in the low-temperature environment. More specifically, when a total opening area of the gas discharge openings is increased, sealing tapes are cleaved in unison in a stage of increase in pressure in the space in the housing as a result of burning of the gas generating agent. Then, a considerable amount of gas is emitted in a burst through the gas discharge openings, and consequently increase in internal pressure significantly drops in particular in the low-temperature environment and intended combustion characteristics cannot be obtained.

In order to solve this problem, it is effective to construct a plurality of gas discharge openings to be opened stepwise with increase in pressure in the space in the housing. When opening pressures of a plurality of gas discharge openings are set in several levels while a total opening area of the plurality of gas discharge openings is increased simply by increasing a size of some of the plurality of gas discharge openings with a geometrically similar shape of a precise circle being maintained, however, it is essential to increase a distance between adjacent gas discharge openings in order to secure pressure-resistant performance of the housing, which results in increase in size of the gas generator.

Additionally, since the output characteristics of the gas generator are dependent on an ambient temperature as described above, it has been demanded to lessen a difference in performance of gas output due to the ambient temperature. When the construction above is adopted, however, sufficient improvement in this regard is not expected either and the difference in performance of gas output due to the ambient temperature noticeably remains.

Therefore, the present invention was made in view of the problems described above, and an object is to provide a gas generator of which reduction in size and weight can be achieved without impairing performance and of which difference in performance of gas output due to an ambient temperature can be lessened.

Solution to Problem

A gas generator based on the present invention includes a housing, a gas generating agent, an igniter, and a sealing tape. The housing has a cylindrical circumferential wall portion provided with a plurality of gas discharge openings and has one end portion and the other end portion in an axial direction of the circumferential wall portion closed. The gas generating agent is arranged in an accommodation space located in the housing. The igniter serves to burn the gas generating agent and is assembled to the housing. The sealing tape closes the plurality of gas discharge openings. Each of the plurality of gas discharge openings is opened as a portion of the sealing tape which closes each of the plurality of gas discharge openings is cleaved with increase in pressure in the accommodation space as a result of burning of the gas generating agent. The plurality of gas discharge openings include gas discharge openings set to be different from one another in opening pressure expressed as F×t×C/S so as to be opened stepwise with increase in pressure in the accommodation space as a result of burning of the gas generating agent, where F represents shear strength of the sealing tape, t represents a thickness of the portion of the sealing tape which closes each of the plurality of gas discharge openings, C represents a circumferential length of each of the plurality of gas discharge openings, and S represents an opening area of each of the plurality of gas discharge openings. A condition of T≤1.8 [mm] and SA≥60 [mm$^2$] is satisfied, where T represents a thickness of a portion of the housing which defines the accommodation space and SA represents a total opening area of the plurality of gas discharge openings. At least one of the plurality of gas discharge openings is in a shape of an elongated hole different in opening width in directions orthogonal to each other.

In the gas generator based on the present invention, all of the plurality of gas discharge openings may be in the shape of the elongated hole different in opening width in the directions orthogonal to each other.

In the gas generator based on the present invention, preferably, the gas discharge opening in the shape of the elongated hole is in such a shape that an opening width along an axial direction of the circumferential wall portion is greater than an opening width along a circumferential direction of the circumferential wall portion.

In the gas generator based on the present invention, opening pressures of the plurality of gas discharge openings may be set differently from one another in n (n being an integer not smaller than three) levels. In that case, preferably, a set ratio of an opening pressure P1 of gas discharge openings of a first level to an opening pressure Pn of gas discharge openings of an nth level is not lower than 0.4 and lower than 0.7 and respective set ratios of opening pressures P2 to Pn−1 of gas discharge openings from a second level to an n−1th level to opening pressure Pn of the gas discharge openings of the nth level are not lower than 0.7 and not higher than 0.95, where P1, P2, . . . , and Pn sequentially represent an opening pressure of the gas discharge openings of the first level set to be lowest in opening pressure to an opening pressure of the gas discharge openings of the nth level set to be highest in opening pressure.

In the gas generator based on the present invention, preferably, respective ratios of sums Sa1 to San of opening areas of gas discharge openings from the first level to the nth level to a total opening area SA of the plurality of gas discharge openings are not lower than 0.7/n and not higher than 1.3/n, where Sa1, Sa2, . . . , and San sequentially represent a sum of opening areas of the gas discharge openings of the first level to a sum of opening areas of the gas discharge openings of the nth level among the plurality of gas discharge openings.

In the gas generator based on the present invention, opening pressures of the plurality of gas discharge openings may be set differently from one another in three levels. In that case, preferably, a set ratio of an opening pressure P1 of gas discharge openings of a first level to an opening pressure P3 of gas discharge openings of a third level is not lower than 0.5 and lower than 0.7 and a set ratio of an opening pressure P2 of gas discharge openings of a second level to opening pressure P3 of the gas discharge openings of the third level is not lower than 0.75 and not higher than 0.95, where P1, P2, and P3 sequentially represent an opening pressure of the gas discharge openings of the first level set to be lowest in opening pressure to an opening pressure of the gas discharge openings of the third level set to be highest in opening pressure.

In the gas generator based on the present invention, preferably, respective ratios of sums Sa1 to Sa3 of opening areas of the gas discharge openings from the first level to the third level to a total opening area SA of the plurality of gas discharge openings are not lower than 0.23 and not higher than 0.44, where Sa1, Sa2, and Sa3 sequentially represent a sum of opening areas of the gas discharge openings of the first level to a sum of opening areas of the gas discharge openings of the third level among the plurality of gas discharge openings.

In the gas generator based on the present invention, the plurality of gas discharge openings may be provided as being aligned along a circumferential direction of the circumferential wall portion.

Advantageous Effects of Invention

According to the present invention, reduction in size and weight of a gas generator can be achieved without impairing performance, and a difference in performance in gas output due to an ambient temperature can be lessened.

BRIEF DESCRIPTION OF DRAWINGS

FIG. 8 shows a table of specifications of a gas generator according to a first example and results of measurement when the gas generator is activated.

FIG. 9 shows a table of specifications of a gas generator according to a second example and results of measurement when the gas generator is activated.

FIG. 10 shows a table of specifications of a gas generator according to a third example and results of measurement when the gas generator is activated.

DESCRIPTION OF EMBODIMENTS

Figure 1:
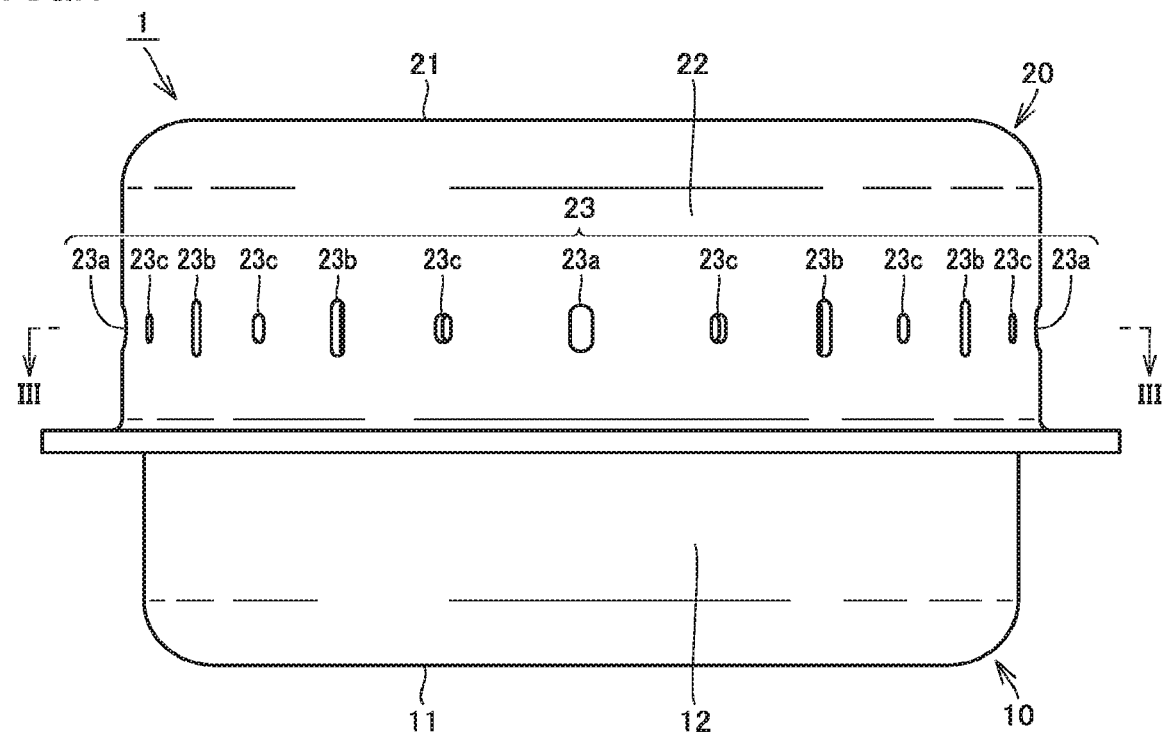
FIG. 1 is a front view of a gas generator in an embodiment of the present invention.

An embodiment of the present invention will be described hereinafter in detail with reference to the drawings. An embodiment shown below represents application of the present invention to a disc type gas generator suitably incorporated in an air bag apparatus equipped in a steering wheel or the like of a car. The same or common elements in the embodiment shown below have the same reference characters allotted in the drawings and description thereof will not be repeated.

Figure 2:
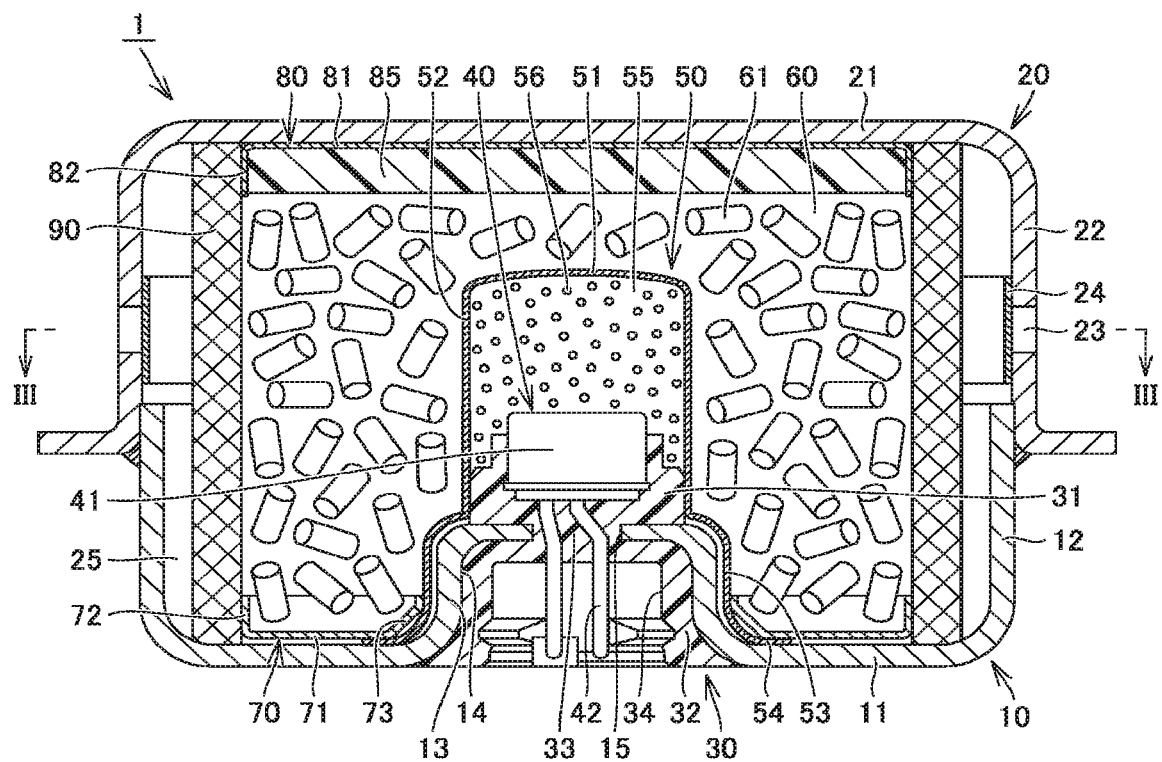
FIG. 2 is a schematic cross-sectional view of the gas generator shown in FIG. 1.

FIG. 1 is a front view of a gas generator in an embodiment of the present invention and FIG. 2 is a schematic cross-sectional view of the gas generator shown in FIG. 1. A construction of a gas generator 1 in the present embodiment will initially be described with reference to FIGS. 1 and 2.

As shown in FIGS. 1 and 2, gas generator 1 in the present embodiment has a short substantially cylindrical housing having axial one and the other ends closed, and is constructed to accommodate as internal construction components in an accommodation space provided in the housing, a holding portion 30, an igniter 40, a cup-shaped member 50, an enhancer agent 56, a gas generating agent 61, a lower-side supporting member 70, an upper-side supporting member 80, a cushion material 85, a filter 90, and the like. In the accommodation space provided in the housing, a combustion chamber 60 mainly accommodating gas generating agent 61 among the internal construction components described above is located.

The short substantially cylindrical housing includes a lower shell 10 and an upper shell 20. Each of lower shell 10 and upper shell 20 is made, for example, of a press-formed product formed by press-working a plate-shaped member made of rolled metal. For example, a metal plate composed of stainless steel, iron steel, an aluminum alloy, a stainless alloy, or the like is made use of as the plate-shaped member made of metal which forms lower shell 10 and upper shell 20, and suitably, what is called a high tensile steel plate which is free from such failure as fracture even at the time of application of tensile stress not lower than 440 [MPa] and not higher than 780 [MPa] is suitably made use of.

Lower shell 10 and upper shell 20 are each formed in a substantially cylindrical shape with bottom, and the housing is constructed by combining and joining the shells such that open surfaces thereof face each other. Lower shell 10 has a bottom plate portion 11 and a circumferential wall portion 12 and upper shell 20 has a top plate portion 21 and a circumferential wall portion 22. The axial one and the other end portions of the housing are thus closed by bottom plate portion 11 and top plate portion 21, respectively. Electron-beam welding, laser welding, friction welding, or the like is suitably made use of for joining lower shell 10 and upper shell 20 to each other.

As shown in FIG. 2, a protruding cylindrical portion 13 protruding toward top plate portion 21 is provided in a central portion of bottom plate portion 11 of lower shell 10, so that a depression portion 14 is provided in the central portion of bottom plate portion 11 of lower shell 10. Protruding cylindrical portion 13 is a site to which igniter 40 is fixed with holding portion 30 described above being interposed, and depression portion 14 is a site serving as a space for providing a female connector portion 34 in holding portion 30.

Protruding cylindrical portion 13 is formed to be in a substantially cylindrical shape with bottom, and an opening 15 in a point asymmetrical shape (for example, in a D shape, a barrel shape, or an elliptical shape) when viewed two-dimensionally is provided at an axial end portion located on a side of top plate portion 21. Opening 15 is a site through which a pair of terminal pins 42 of igniter 40 passes.

Igniter 40 serves to produce flames and includes an ignition portion 41 and a pair of terminal pins 42 described above. Ignition portion 41 contains an ignition agent producing flames by being ignited to burn at the time of activation and a resistor for igniting this ignition agent. The pair of terminal pins 42 is connected to ignition portion 41 for igniting the ignition agent.

More specifically, ignition portion 41 includes a squib cup formed like a cup and a base portion closing an opening end of the squib cup and holding a pair of terminal pins 42 as being inserted therein. The resistor (bridge wire) is attached to couple tip ends of the pair of terminal pins 42 inserted in the squib cup, and the ignition agent is loaded in the squib cup so as to surround the resistor or to be in proximity to the resistor.

Here, a Nichrome wire or the like is generally made use of as a resistor, and ZPP (zirconium potassium perchlorate), ZWPP (zirconium tungsten potassium perchlorate), lead tricinate, or the like is generally made use of as the ignition agent. The squib cup and the base portion described above are generally made of a metal or plastic.

Upon sensing collision, a prescribed amount of current flows in a resistor through terminal pin 42. As the prescribed amount of current flows in the resistor, Joule heat is generated in the resistor and the ignition agent starts burning. Flame at a high temperature caused by burning bursts the squib cup accommodating the ignition agent. A time period from flow of a current in the resistor until activation of igniter 40 is generally not longer than two milliseconds in a case that the Nichrome wire is employed as the resistor.

Igniter 40 is attached to bottom plate portion 11 in such a manner that terminal pin 42 is introduced from the inside of lower shell 10 to pass through opening 15 provided in protruding cylindrical portion 13. Specifically, holding portion 30 formed from a resin molded portion is provided around protruding cylindrical portion 13 provided in bottom plate portion 11, and igniter 40 is fixed to bottom plate portion 11 as being held by holding portion 30.

Holding portion 30 is formed through injection molding (more specifically, insert molding) with the use of a mold, and formed by attaching an insulating fluid resin material to bottom plate portion 11 so as to reach a part of an outer surface from a part of an inner surface of bottom plate portion 11 through opening 15 provided in bottom plate portion 11 of lower shell 10 and solidifying the fluid resin material.

Igniter 40 is fixed to bottom plate portion 11 with holding portion 30 being interposed, in such a manner that terminal pin 42 is introduced from the inside of lower shell 10 to pass through opening 15 during molding of holding portion 30 and the fluid resin material described above is fed to fill a space between igniter 40 and lower shell 10 in this state.

For a source material for holding portion 30 formed by injection molding, a resin material excellent in heat resistance, durability, corrosion resistance, and the like after curing is suitably selected and made use of. In that case, without being limited to a thermosetting resin represented by an epoxy resin and the like, a thermoplastic resin represented by a polybutylene terephthalate resin, a polyethylene terephthalate resin, a polyamide resin (such as nylon 6 or nylon 66), a polypropylene sulfide resin, a polypropylene oxide resin, and the like can also be made use of. In a case where these thermoplastic resins are selected as a source material, in order to ensure mechanical strength of holding portion 30 after molding, glass fibers or the like are preferably contained as fillers in these resin materials. In a case where sufficient mechanical strength can be ensured only by a thermoplastic resin, however, a filler as described above does not have to be added.

Holding portion 30 has an inner cover portion 31 covering a part of an inner surface of bottom plate portion 11 of lower shell 10, an outer cover portion 32 covering a part of an outer surface of bottom plate portion 11 of lower shell 10, and a coupling portion 33 located within opening 15 provided in bottom plate portion 11 of lower shell 10 and continuing to each of inner cover portion 31 and outer cover portion 32.

Holding portion 30 is secured to bottom plate portion 11 at a surface on a side of bottom plate portion 11, of each of inner cover portion 31, outer cover portion 32, and coupling portion 33. Holding portion 30 is secured to each of a side surface and a lower surface of a portion of igniter 40 which is closer to a lower end of ignition portion 41, as well as a surface of a portion of igniter 40 which is closer to an upper end of terminal pin 42. Thus, opening 15 is completely buried by terminal pin 42 and holding portion 30, so that hermeticity of the space in the housing is ensured by sealability ensured in that portion. Since opening 15 is provided to be point asymmetrical in a plan view as described above, opening 15 and coupling portion 33 also function as a rotation stop mechanism which prevents rotation of holding portion 30 with respect to bottom plate portion 11, by burying opening 15 with coupling portion 33.

In a portion of outer cover portion 32 of holding portion 30, which faces the outside, female connector portion 34 is formed. This female connector portion 34 is a site for receiving a male connector (not shown) of a harness for connecting igniter 40 and a control unit (not shown) to each other, and it is located in depression portion 14 provided in bottom plate portion 11 of lower shell 10. In this female connector portion 34, a portion of igniter 40 closer to the lower end of terminal pin 42 is arranged as being exposed. The male connector is inserted in female connector portion 34, so that electrical conduction between a core wire of the harness and terminal pin 42 is established.

Injection molding described above may be carried out with the use of lower shell 10 obtained by providing an adhesive layer in advance at a prescribed position on a surface of bottom plate portion 11 in a portion to be covered with holding portion 30. The adhesive layer can be formed by applying an adhesive in advance to a prescribed position of bottom plate portion 11 and curing the adhesive.

By doing so, the cured adhesive layer is located between bottom plate portion 11 and holding portion 30, so that holding portion 30 formed from a resin molded portion can more firmly be secured to bottom plate portion 11. Therefore, by providing the adhesive layer annularly along a circumferential direction so as to surround opening 15 provided in bottom plate portion 11, higher sealability can be ensured in that portion.

For the adhesive applied in advance to bottom plate portion 11, an adhesive containing as a source material, a resin material excellent in heat resistance, durability, corrosion resistance, and the like after curing is suitably made use of, and for example, an adhesive containing a cyanoacrylate-based resin or a silicone-based resin as a source material is particularly suitably made use of. An adhesive containing, other than the resin materials described above, a phenol-based resin, an epoxy-based resin, a melamine-based resin, a urea-based resin, a polyester-based resin, an alkyd-based resin, a polyurethane-based resin, a polyimide-based resin, a polyethylene-based resin, a polypropylene-based resin, a polyvinyl chloride-based resin, a polystyrene-based resin, a polyvinyl acetate-based resin, a polytetrafluoroethylene-based resin, an acrylonitrile butadiene styrene-based resin, an acrylonitrile styrene-based resin, an acrylic resin, a polyamide-based resin, a polyacetal-based resin, a polycarbonate-based resin, a polyphenylene ether-based resin, a polybutylene terephthalate-based resin, a polyethylene terephthalate-based resin, a polyolefin-based resin, a polyphenylene sulfide-based resin, a polysulfone-based resin, polyether sulfone-based resin, a polyarylate-based resin, a polyether ether ketone-based resin, a polyamide imide-based resin, a liquid crystal polymer, styrene-based rubber, olefin-based rubber, and the like can be made use of as the adhesive described above.

Though such a construction example that igniter 40 can be fixed to lower shell 10 by injection molding holding portion 30 formed from the resin molded portion is exemplified, other alternative means can also be used for fixing igniter 40 to lower shell 10.

Cup-shaped member 50 is assembled to bottom plate portion 11 so as to cover protruding cylindrical portion 13, holding portion 30, and igniter 40. Cup-shaped member 50 has a substantially cylindrical shape with bottom having an open end portion on the side of bottom plate portion 11, and contains an enhancer chamber 55 accommodating enhancer agent 56. Cup-shaped member 50 is arranged to protrude toward combustion chamber 60 accommodating gas generating agent 61, such that enhancer chamber 55 provided therein faces ignition portion 41 of igniter 40.

Cup-shaped member 50 has a top wall portion 51 and a sidewall portion 52 defining enhancer chamber 55 described above and an extension portion 53 extending radially outward from a portion of sidewall portion 52 on a side of an open end. Extension portion 53 is formed to extend along an inner surface of bottom plate portion 11 of lower shell 10. Specifically, extension portion 53 is in a shape curved along a shape of an inner bottom surface of bottom plate portion 11 in a portion where protruding cylindrical portion 13 is provided and in the vicinity thereof and includes a tip end portion 54 extending like a flange in a radially outer portion thereof.

Tip end portion 54 in extension portion 53 is arranged between bottom plate portion 11 and lower-side supporting member 70 along the axial direction of the housing and sandwiched between bottom plate portion 11 and lower-side supporting member 70 along the axial direction of the housing. Since lower-side supporting member 70 is pressed toward bottom plate portion 11 by gas generating agent 61, cushion material 85, upper-side supporting member 80, and top plate portion 21 arranged above, cup-shaped member 50 is in such a state that tip end portion 54 of extension portion 53 is pressed toward bottom plate portion 11 by lower-side supporting member 70 and fixed to bottom plate portion 11. Thus, cup-shaped member 50 is prevented from falling from bottom plate portion 11 without using caulking or press-fitting for fixing cup-shaped member 50.

Cup-shaped member 50 has an opening in neither of top wall portion 51 and sidewall portion 52 and surrounds enhancer chamber 55 provided therein. This cup-shaped member 50 bursts or melts with increase in pressure in enhancer chamber 55 or conduction of heat generated therein when enhancer agent 56 is ignited as a result of activation of igniter 40, and mechanical strength thereof is relatively low.

Therefore, a member made of metal such as aluminum or an aluminum alloy or a member made of a resin such as a thermosetting resin represented by an epoxy resin and the like and a thermoplastic resin represented by a polybutylene terephthalate resin, a polyethylene terephthalate resin, a polyamide resin (such as nylon 6 or nylon 66), a polypropylene sulfide resin, a polypropylene oxide resin, and the like is suitably made use of for cup-shaped member 50.

In addition to the above, a component which is formed from a member made of metal high in mechanical strength as represented by iron or copper, has an opening in sidewall portion 52 thereof, and has a sealing tape adhered to close the opening can also be made use of for cup-shaped member 50. A method of fixing cup-shaped member 50 is not limited to a fixing method using lower-side supporting member 70 described above, and other fixing methods may be made use of.

Enhancer agent 56 charged into enhancer chamber 55 generates thermal particles as it is ignited to burn by flames produced as a result of activation of igniter 40. Enhancer agent 56 should be able to reliably start burning gas generating agent 61, and generally, a composition or the like composed of metal powders/oxidizing agent represented by B/KNO$_3$ or the like is employed. For enhancer agent 56, a powdery enhancer agent, an enhancer agent formed in a prescribed shape by a binder, or the like is made use of. A shape of enhancer agent 56 formed by a binder includes, for example, various shapes such as a granule, a column, a sheet, a sphere, a cylinder with a single hole, a cylinder with multiple holes, a tablet, and the like.

In a space surrounding a portion where cup-shaped member 50 described above is arranged in a space inside the housing, combustion chamber 60 accommodating gas generating agent 61 is located. Specifically, as described above, cup-shaped member 50 is arranged to protrude into combustion chamber 60 formed in the housing, and a space provided in a portion facing the outer surface of sidewall portion 52 of this cup-shaped member 50 and a space provided in a portion facing the outer surface of top wall portion 51 are provided as combustion chamber 60.

In a space surrounding combustion chamber 60 accommodating gas generating agent 61 in a radial direction of the housing, filter 90 is arranged along an inner circumference of the housing. Filter 90 has a cylindrical shape, and it is arranged such that a central axis thereof substantially matches with the axial direction of the housing.

Gas generating agent 61 is an agent which is ignited by thermal particles generated as a result of activation of igniter 40 and produces a gas as it burns. A non-azide-based gas generating agent is preferably employed as gas generating agent 61, and gas generating agent 61 is formed as a molding generally containing a fuel, an oxidizing agent, and an additive. For the fuel, for example, a triazole derivative, a tetrazole derivative, a guanidine derivative, an azodicarbonamide derivative, a hydrazine derivative, or the like, or combination thereof is made use of. Specifically, for example, nitroguanidine, guanidine nitrate, cyanoguanidine, 5-aminotetrazole, and the like are suitably made use of. In addition, as the oxidizing agent, for example, basic nitrate such as basic copper nitrate, perchlorate such as ammonium perchlorate or potassium perchlorate, nitrate containing cations selected from an alkali metal, an alkali earth metal, a transition metal, and ammonia, or the like is made use of. As the nitrate, for example, sodium nitrate, potassium nitrate, or the like is suitably made use of. Moreover, as the additive, a binder, a slag formation agent, a combustion modifier, or the like is exemplified. As the binder, for example, metal salt of carboxymethyl cellulose, an organic binder such as stearate, or an inorganic binder such as synthetic hydrotalcite and Japanese acid clay can suitably be made use of. As the slag formation agent, silicon nitride, silica, Japanese acid clay, or the like can suitably be made use of. In addition, as the combustion modifier, a metal oxide, ferrosilicon, activated carbon, graphite, or the like can suitably be made use of.

A shape of a molding of gas generating agent 61 includes various shapes such as a particulate shape including a granule, a pellet, and a column, and a disc shape. In addition, among columnar moldings, a molding with holes having through holes in the molding (such as a cylindrical shape with a single hole or a cylindrical shape with multiple holes) is also made use of. These shapes are preferably selected as appropriate depending on specifications of an air bag apparatus in which gas generator 1 is incorporated, and for example, a shape optimal for the specifications is preferably selected by selecting a shape allowing change over time of a rate of generation of a gas during burning of gas generating agent 61. Furthermore, in addition to a shape of gas generating agent 61, a size of a molding or an amount thereof for filling is preferably selected as appropriate, in consideration of a linear burning velocity, a pressure exponent, or the like of gas generating agent 61.

For example, a filter obtained by winding and sintering a metal wire rod of stainless steel or iron steel, a filter formed by press-working a mesh material into which metal wire rods are knitted to thereby pack the same, a filter obtained by winding a perforated metal plate, or the like is made use of as filter 90. Here, as the mesh material, specifically, a wire gauze of stocking stitch, a plain-woven wire gauze, an aggregate of crimped metal wire rods, or the like is made use of. In addition, as the perforated metal plate, for example, expanded metal obtained by making staggered cuts in a metal plate and providing holes by widening the cuts to thereby work the metal plate in a mesh, hook metal obtained by perforating a metal plate and collapsing burrs caused around a periphery of the hole for flattening, or the like is made use of. In this case, a size or a shape of a hole to be provided can be changed as appropriate as required, and holes different in size or shape may be included in the same metal plate. It is noted that, for example, a steel plate (mild steel) or a stainless steel plate can suitably be made use of as a metal plate, and a nonferrous metal plate of aluminum, copper, titanium, nickel, or an alloy thereof, or the like can also be made use of.

Filter 90 functions as cooling means for cooling a gas by depriving heat at a high temperature of the gas when the gas produced in combustion chamber 60 passes through this filter 90 and also functions as removal means for removing residues (slag) or the like contained in the gas. Therefore, in order to sufficiently cool the gas and to prevent emission of residues to the outside, the gas generated in combustion chamber 60 should reliably pass through filter 90. Filter 90 is arranged to be distant from circumferential wall portions 12 and 22 so as to provide a gap 25 of a prescribed size between circumferential wall portion 22 of upper shell 20 and circumferential wall portion 12 of lower shell 10 which form the circumferential wall portion of the housing.

As shown in FIGS. 1 and 2, a plurality of gas discharge openings 23 are provided in circumferential wall portion 22 of upper shell 20 in a portion facing filter 90. The plurality of gas discharge openings 23 serve for guiding a gas which has passed through filter 90 to the outside of the housing.

As shown in FIG. 2, to an inner circumferential surface of circumferential wall portion 22 of upper shell 20, a sealing tape 24 made of a metal is attached to close the plurality of gas discharge openings 23. An aluminum foil or the like having a tacky member applied to its one surface is made use of as this sealing tape 24 and hermeticity of combustion chamber 60 is ensured by sealing tape 24.

As shown in FIG. 1, in gas generator 1 in the present embodiment, the plurality of gas discharge openings 23 include three types of gas discharge openings different in construction from one another (that is, a first gas discharge opening 23a, a second gas discharge opening 23b, and a third gas discharge opening 23c). These three types of gas discharge openings are constructed to be different in opening pressure from one another so as to be opened stepwise with increase in pressure in the above-described accommodation space which is a space in the housing as a result of burning of gas generating agent 61 at the time of activation of gas generator 1.

Filter 90 and gap 25 are located between combustion chamber 60 and the plurality of gas discharge openings 23 as described above. A flow resistance of filter 90 against gas, however, is relatively low, and hence a pressure in the accommodation space is substantially equal to an internal pressure in combustion chamber 60. Therefore, in the description below, this pressure may also be referred to as the internal pressure in combustion chamber 60 instead of a pressure in the accommodation space.

First gas discharge opening 23a, second gas discharge opening 23b, and third gas discharge opening 23c described above are constructed to be different from one another in opening pressure owing to a difference in shape of opening thereof.

By thus including a plurality of types of gas discharge openings 23 different in opening pressure from one another, significant drop in increase in internal pressure in the combustion chamber at the time of activation in particular in a low-temperature environment can be prevented and intended combustion characteristics can be obtained. Details thereof and a more detailed construction of the plurality of types of gas discharge openings 23 will be described later.

Referring again to FIG. 2, in the vicinity of the end portion of combustion chamber 60 located on the side of bottom plate portion 11, lower-side supporting member 70 is arranged. Lower-side supporting member 70 has an annular shape and is arranged as substantially being applied to filter 90 and bottom plate portion 11 so as to cover a boundary portion between filter 90 and bottom plate portion 11. Thus, lower-side supporting member 70 is located between bottom plate portion 11 and gas generating agent 61 in the vicinity of the end portion of combustion chamber 60.

Lower-side supporting member 70 has an abutment portion 72 erected to abut to the inner circumferential surface of the axial end portion of filter 90 located on the side of bottom plate portion 11 and a bottom portion 71 provided to extend radially inward from abutment portion 72. Bottom portion 71 is formed to extend along an inner bottom surface of bottom plate portion 11 of lower shell 10. Specifically, bottom portion 71 is in a shape bent along the shape of the inner bottom surface of bottom plate portion 11 including a portion where protruding cylindrical portion 13 is provided, and includes a tip end portion 73 erected in a radially inward portion thereof.

Lower-side supporting member 70 functions as flow-out prevention means for preventing a gas generated in combustion chamber 60 at the time of activation from flowing out through a gap between the lower end of filter 90 and bottom plate portion 11 without passing through filter 90. Lower-side supporting member 70 is formed, for example, by press-working a plate-shaped member made of metal, and suitably made of a member formed from a steel plate of common steel, special steel, or the like (such as a cold rolled steel plate or a stainless steel plate).

Tip end portion 54 of extension portion 53 of cup-shaped member 50 described above is arranged between bottom plate portion 11 and bottom portion 71 of lower-side supporting member 70 along the axial direction of the housing, and thus is held as being sandwiched between bottom plate portion 11 and bottom portion 71 along the axial direction of the housing. Cup-shaped member 50 is thus in such a state that tip end portion 54 of extension portion 53 is pressed toward bottom plate portion 11 by bottom portion 71 of lower-side supporting member 70 and fixed to bottom plate portion 11.

Upper-side supporting member 80 is arranged at the end portion of combustion chamber 60 located on the side of top plate portion 21. Upper-side supporting member 80 is substantially in a shape of a disc and is arranged as being applied to filter 90 and top plate portion 21 so as to cover the boundary portion between filter 90 and top plate portion 21. Thus, upper-side supporting member 80 is located between top plate portion 21 and gas generating agent 61 in the vicinity of the end portion of combustion chamber 60.

Upper-side supporting member 80 has a bottom portion 81 abutting to top plate portion 21 and an abutment portion 82 erected from a peripheral edge of bottom portion 81. Abutment portion 82 abuts to the inner circumferential surface of an axial end portion of filter 90 located on the side of top plate portion 21.

Upper-side supporting member 80 functions as flow-out prevention means for preventing a gas generated in combustion chamber 60 at the time of activation from flowing out through a gap between the upper end of filter 90 and top plate portion 21 without passing through filter 90. Similarly to lower-side supporting member 70, upper-side supporting member 80 is formed, for example, by press-working a plate-shaped member made of metal, and suitably made of a member formed from a steel plate of common steel, special steel, or the like (such as a cold rolled steel plate or a stainless steel plate).

In this upper-side supporting member 80, an annular cushion material 85 is arranged to be in contact with gas generating agent 61 accommodated in combustion chamber 60. Cushion material 85 is thus located between top plate portion 21 and gas generating agent 61 in a portion of combustion chamber 60 on the side of top plate portion 21 and presses gas generating agent 61 toward bottom plate portion 11. This cushion material 85 is provided for the purpose of preventing gas generating agent 61 made of a molding from being crushed by vibration or the like, and made of a member suitably formed of a molding of ceramic fibers, rock wool, or a foamed resin (such as foamed silicone, foamed polypropylene, or foamed polyethylene), or rubber represented by chloroprene and EPDM.

An operation of gas generator 1 in the present embodiment described above will now be described with reference to FIG. 2.

When a vehicle on which gas generator 1 in the present embodiment is mounted collides, collision sensing means separately provided in the vehicle senses collision, and based thereon, igniter 40 is activated in response to power feed through a control unit separately provided in the vehicle. Enhancer agent 56 accommodated in enhancer chamber 55 is ignited to burn by flames produced as a result of activation of igniter 40, to thereby generate a large amount of thermal particles. Burning of this enhancer agent 56 bursts or melts cup-shaped member 50 and the thermal particles described above flow into combustion chamber 60.

The thermal particles which have flowed in ignite and burn gas generating agent 61 accommodated in combustion chamber 60 and a large amount of gas is produced.

The gas produced in combustion chamber 60 passes through filter 90. At that time, heat is deprived of the gas through filter 90 and the gas is cooled, slag contained in the gas is removed by filter 90, and the gas flows into gap 25.

As a pressure in the space in the housing increases, sealing tape 24 which has closed gas discharge opening 23 provided in upper shell 20 is cleaved and the gas is discharged to the outside of the housing through gas discharge opening 23. The plurality of gas discharge openings 23 are opened stepwise and the discharged gas is introduced in the air bag provided adjacent to gas generator 1 and it expands and develops the air bag.

Figure 3:
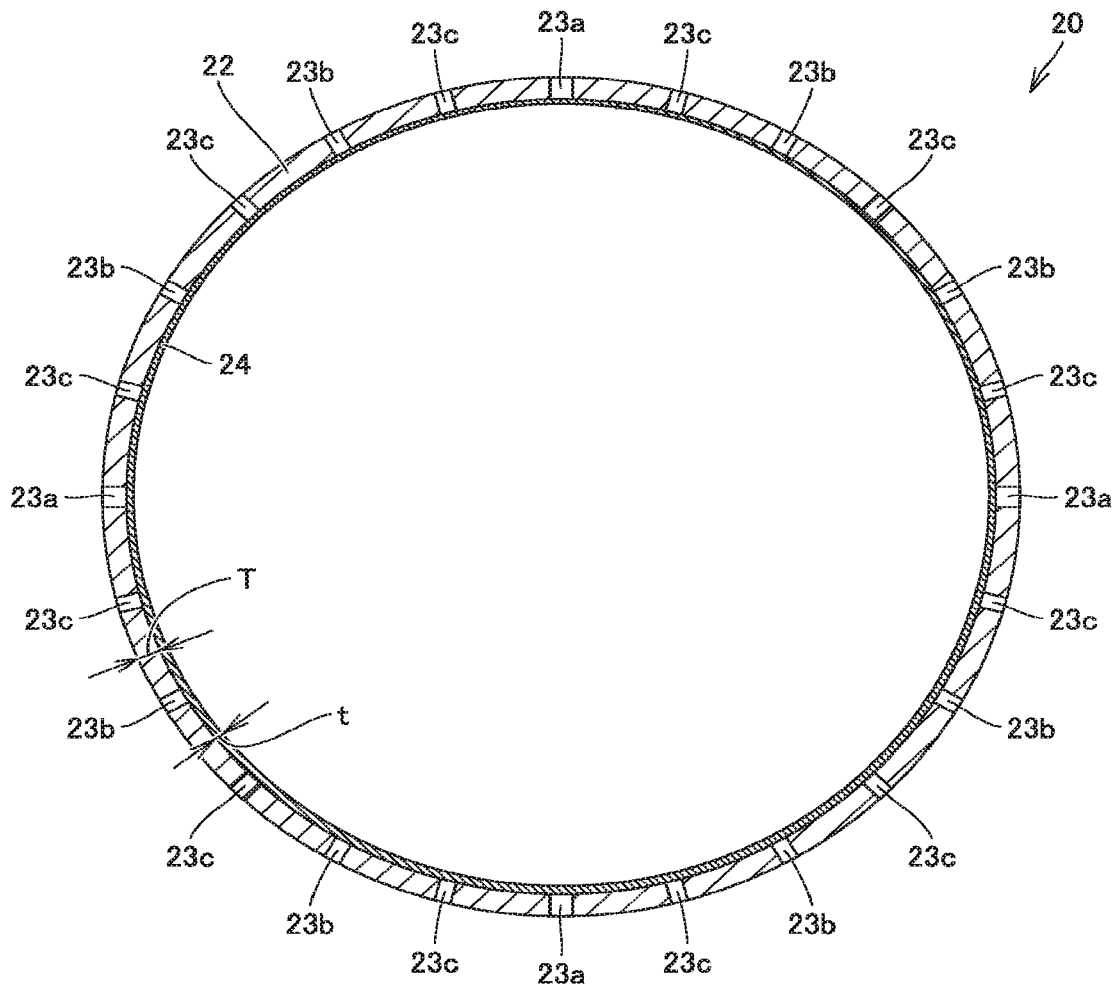
FIG. 3 is a cross-sectional view of an upper shell and a sealing tape along the line III-III shown in FIGS. 1 and 2.
Figure 4:
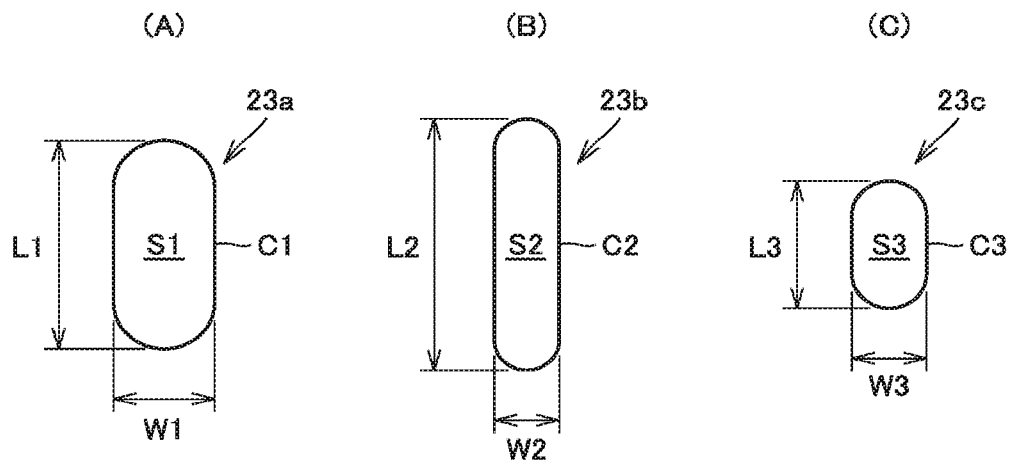
FIG. 4 is an enlarged view of first to third gas discharge openings shown in FIGS. 1 and 3.

FIG. 3 is a cross-sectional view of the upper shell and the sealing tape along the line shown in FIGS. 1 and 2 and FIG. 4 is an enlarged view of the first to third gas discharge openings shown in FIGS. 1 and 3. A more detailed construction of first to third gas discharge openings 23a to 23c will be described below with reference to FIGS. 3 and 4 and FIG. 1 above.

As shown in FIGS. 1 and 3, in the present embodiment, first gas discharge opening 23a, second gas discharge opening 23b, and third gas discharge opening 23c described above are provided as being aligned under a prescribed rule along the circumferential direction of circumferential wall portion 22 of upper shell 20. More specifically, twenty-four gas discharge openings 23 in total are provided as being aligned at a prescribed regular pitch along the circumferential direction of circumferential wall portion 22 of upper shell 20.

Four first gas discharge openings 23a in total are provided and arranged every 90° along the circumferential direction of circumferential wall portion 22 of upper shell 20. Eight second gas discharge openings 23b in total are provided and arranged every 45° along the circumferential direction of circumferential wall portion 22 of upper shell 20. Twelve third gas discharge openings 23c in total are provided and arranged every 30° along the circumferential direction of circumferential wall portion 22 of upper shell 20.

First gas discharge opening 23a, second gas discharge opening 23b, and third gas discharge opening 23c are arranged along the circumferential direction of circumferential wall portion 22 of upper shell 20 in the order of first gas discharge opening 23a, third gas discharge opening 23c, second gas discharge opening 23b, third gas discharge opening 23c, second gas discharge opening 23b, and third gas discharge opening 23c, with this set being defined as one set and with four sets as such being repeated.

As shown in FIGS. 1 and 4 (A), first gas discharge opening 23a is in a shape of an elongated hole different in opening width in directions orthogonal to each other. More specifically, the first gas discharge opening is in such a shape of a longitudinally elongated hole that an opening width L1 along the axial direction of circumferential wall portion 22 of upper shell 20 (hereinafter opening width L1 along the axial direction of circumferential wall portion 22 being also referred to as a length L1) is greater than an opening width W1 along the circumferential direction of circumferential wall portion 22 (hereinafter opening width W1 along the circumferential direction of circumferential wall portion 22 being simply also referred to as a width W1). Strictly speaking, first gas discharge opening 23a is provided as a track-shaped hole having a pair of opening edge portions extending in parallel along the axial direction of circumferential wall portion 22.

As shown in FIGS. 1 and 4 (B), second gas discharge opening 23b is in a shape of an elongated hole different in opening width in directions orthogonal to each other. More specifically, the second gas discharge opening is in such a shape of a longitudinally elongated hole that an opening width L2 along the axial direction of circumferential wall portion 22 of upper shell 20 (hereinafter opening width L2 along the axial direction of circumferential wall portion 22 being also referred to as a length L2) is greater than an opening width W2 along the circumferential direction of circumferential wall portion 22 (hereinafter opening width W2 along the circumferential direction of circumferential wall portion 22 being simply also referred to as a width W2). Strictly speaking, second gas discharge opening 23b is provided as a track-shaped hole having a pair of opening edge portions extending in parallel along the axial direction of circumferential wall portion 22.

As shown in FIGS. 1 and 4 (C), third gas discharge opening 23c is in a shape of an elongated hole different in opening width in directions orthogonal to each other. More specifically, the third gas discharge opening is in such a shape of a longitudinally elongated hole that an opening width L3 along the axial direction of circumferential wall portion 22 of upper shell 20 (hereinafter opening width L3 along the axial direction of circumferential wall portion 22 being also referred to as a length L3) is greater than an opening width W3 along the circumferential direction of circumferential wall portion 22 (hereinafter opening width W3 along the circumferential direction of circumferential wall portion 22 being simply also referred to as a width W3). Strictly speaking, third gas discharge opening 23c is provided as a track-shaped hole having a pair of opening edge portions extending in parallel along the axial direction of circumferential wall portion 22.

First gas discharge opening 23a, second gas discharge opening 23b, and third gas discharge opening 23c are all in a shape of a longitudinally elongated hole and thus all gas discharge openings 23 are in the shape of the longitudinally elongated hole.

Referring to FIGS. 4 (A) to 4 (C), S1 to S3 satisfy a condition of S1>S2>S3 where S1 represents an opening area per one first gas discharge opening 23a, S2 represents an opening area per one second gas discharge opening 23b, and S3 represents an opening area per one third gas discharge opening 23c. So long as this condition is satisfied, relation in magnitude among lengths L1 to L3 and relation in magnitude among widths W1 to W3 described above are not restricted.

Referring to FIG. 3, sealing tape 24 is applied to the inner circumferential surface of upper shell 20 as described above and sealing tape 24 closes each of twenty-four gas discharge openings 23 in total. Sealing tape 24 is applied such that circumferential end portions thereof abut on each other, and twenty-four gas discharge openings 23 in total are covered with one sealing tape 24.

An opening pressure of gas discharge opening 23 is expressed as F×t×C/S, where F represents shear strength (tensile strength) of sealing tape 24, t represents a thickness of a portion of sealing tape 24 which closes gas discharge opening 23 (see FIG. 3), C represents a circumferential length of the gas discharge opening (circumferential lengths C1 to C3 shown in FIG. 4 which correspond to circumferential length C), and S represents an opening area of gas discharge opening 23 (opening areas S1 to S3 described above which correspond to opening area S).

Therefore, by appropriately adjusting circumferential lengths C1 to C3 and opening areas S1 to S3 described above, an opening pressure of first gas discharge opening 23a is set to be lowest, an opening pressure of second gas discharge opening 23b is set to be second lowest, and an opening pressure of third gas discharge opening 23c is set to be highest in the present embodiment.

In setting the opening pressure, as is understood from the expression above, the opening pressure can be higher by setting a longer circumferential length C while opening area S remains the same. In other words, by constructing gas discharge opening 23 to be in a shape of a longitudinally elongated hole as in the present embodiment, various opening pressures can be set while an interval between adjacent gas discharge openings 23 is sufficiently ensured in order to suppress lowering in pressure-resistant performance of the housing. A degree of freedom in design is significantly improved and gas generator 1 can consequently be reduced in size as compared with an example in which opening pressures of the plurality of gas discharge openings are set in several levels while a total opening area of the plurality of gas discharge openings is increased simply by increasing a size of some of the plurality of gas discharge openings with a geometrically similar shape of a precise circle being maintained.

Gas generator 1 in the present embodiment is constructed such that a total opening area SA of twenty-four gas discharge openings 23 in total satisfies a condition of SA≥60 [mm²]. Thus, a pressure in the space in the housing at the time of activation can considerably be lowered within a range in which gas generating agent 61 can be burnt continually in a stable manner. A pressure in the space in the housing at the time of activation of a general gas generator of which amount of gas generation is approximately 1.2 [mol] is approximately from 30 to 40 [MPa] in a room-temperature environment, whereas a pressure in the space in the housing at the time of activation of gas generator 1 in the present embodiment is lowered to approximately 20 [MPa] in the room-temperature environment.

In gas generator 1 in the present embodiment, with lowering in pressure in the space in the housing at the time of activation described above, thickness T (see FIG. 3) of lower shell 10 and upper shell 20 in a portion which defines the space in the housing (that is, the accommodation space described above) can be made smaller to such an extent as satisfying a condition of T≤1.8 [mm]. A thickness of the housing of the general gas generator of which amount of gas generator is approximately 1.2 [mol] described above is approximately 2.0 [mm], whereas in gas generator 1 in the present embodiment, thickness T can be made smaller to approximately 1.2 [mm].

In gas generator 1 in the present embodiment, with decrease in thickness of the housing described above, a weight thereof can drastically be reduced. A weight of the general gas generator of which amount of gas generation is approximately 1.2 [mol] described above is approximately 320 [g], whereas a weight of gas generator 1 in the present embodiment can be reduced to approximately 220 [g].

Figure 5:
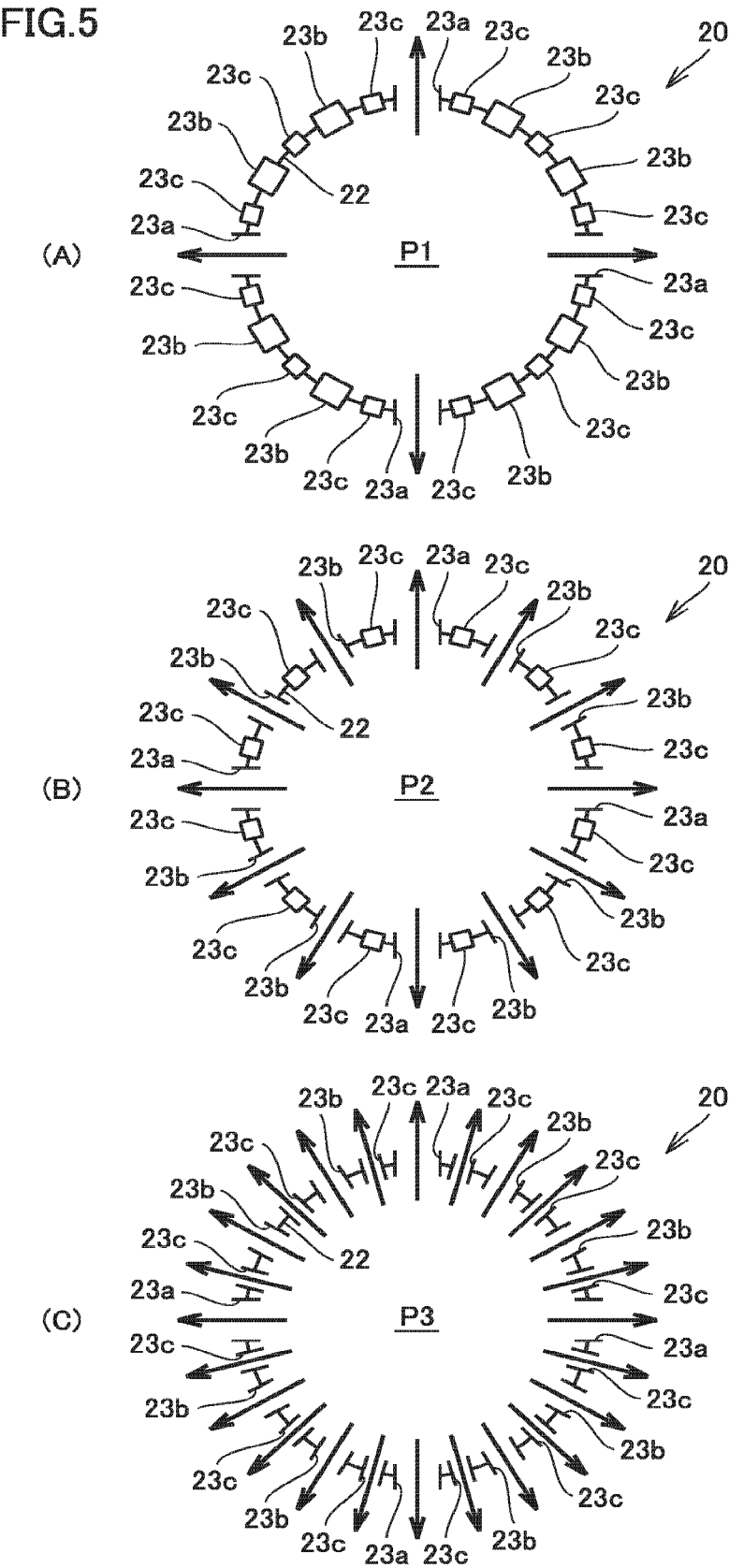
FIG. 5 schematically shows stepwise opening of the gas discharge openings at the time of activation of the gas generator in the embodiment of the present invention.
Figure 6:
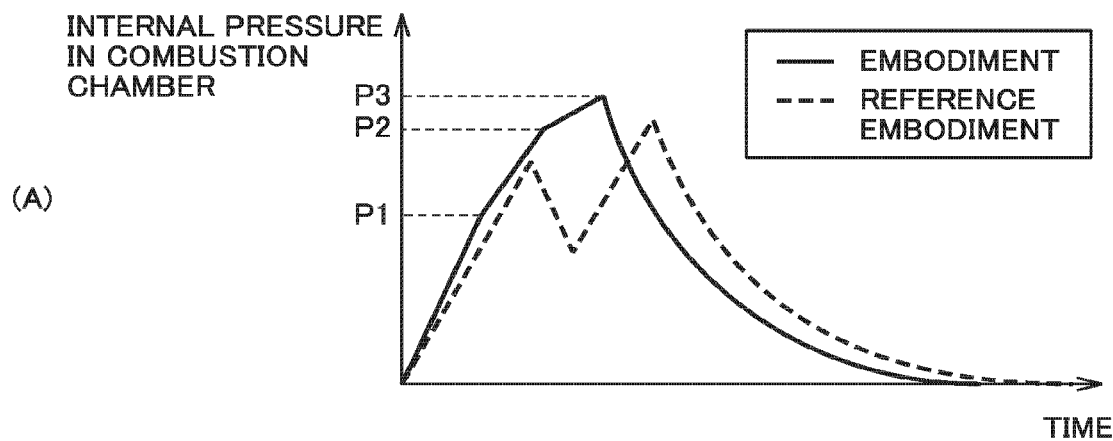
FIG. 6 is a graph showing combustion characteristics at the time of activation of the gas generator in the embodiment of the present invention in a low-temperature environment.
Figure 6:
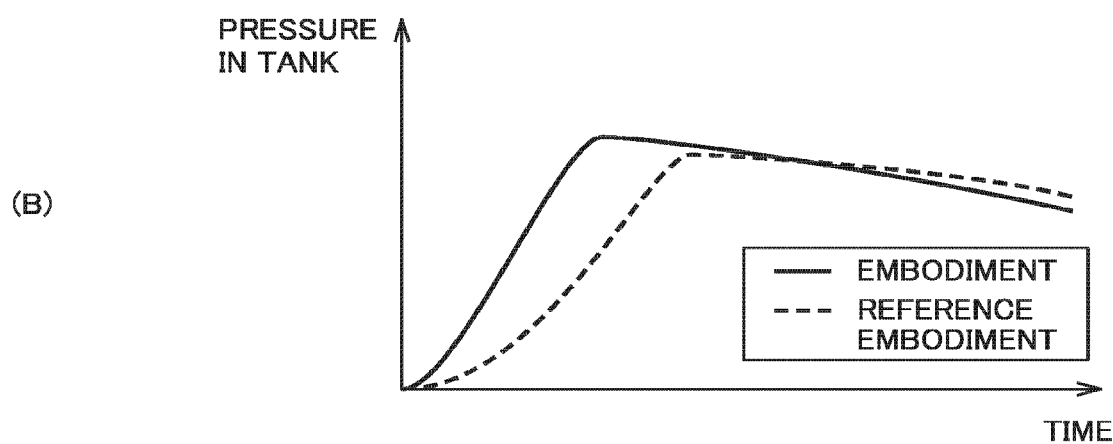

FIG. 5 schematically shows stepwise opening of the gas discharge openings at the time of activation of the gas generator in the present embodiment and FIG. 6 shows a graph showing combustion characteristics at the time of activation of the gas generator in the present embodiment in a low-temperature environment. A reason why significant drop in increase in internal pressure at the time of activation can be prevented and intended combustion characteristics can be obtained in particular in a low-temperature environment in gas generator 1 in the present embodiment will be described below with reference to FIGS. 5 and 6.

FIGS. 5 (A), 5 (B), and 5 (C) each schematically show a state at the time point of lapse of a prescribed period of time since start of activation, and the elapsed time is longer in the order of FIGS. 5 (A), 5 (B), to 5 (C). FIG. 6 (A) shows a graph of change over time in internal pressure in the combustion chamber and FIG. 6 (B) shows a graph of change over time in pressure in a hermetically sealed tank when gas generator 1 in the present embodiment is arranged in the tank and activated.

When gas generator 1 in the present embodiment is activated, gas generating agent 61 starts to burn and an internal pressure in combustion chamber 60 accordingly starts to increase. In gas generator 1 in the present embodiment, in a process of increase in internal pressure in combustion chamber 60, the plurality of gas discharge openings 23 open stepwise.

In a first stage after start of activation, as shown in FIG. 6 (A), the internal pressure in combustion chamber 60 has not reached a pressure at which all of first gas discharge opening 23a, second gas discharge opening 23b, and third gas discharge opening 23c can open. Therefore, first gas discharge opening 23a, second gas discharge opening 23b, and third gas discharge opening 23c do not open and the internal pressure continues to increase.

In a second stage after start of activation, as shown in FIG. 6 (A), the internal pressure in combustion chamber 60 reaches an internal pressure P1 at which four first gas discharge openings 23a lowest in opening pressure among first gas discharge openings 23a, second gas discharge openings 23b, and third gas discharge openings 23c can open, and portions of sealing tape 24 covering four first gas discharge openings 23a are accordingly cleaved as shown in FIG. 5 (A) so that a gas is discharged through four open first gas discharge openings 23a. Thus, gas output is obtained in a relatively short period of time since start of activation as shown in FIG. 6 (B) and expansion and development of the air bag can be started in an early stage.

In a third stage after start of activation, as shown in FIG. 6 (A), the internal pressure in combustion chamber 60 reaches an internal pressure P2 at which eight second gas discharge openings 23b second lowest in opening pressure among first gas discharge openings 23a, second gas discharge openings 23b, and third gas discharge openings 23c can open, and portions of sealing tape 24 covering eight second gas discharge openings 23b are accordingly cleaved as shown in FIG. 5 (B) so that a gas is discharged through open first gas discharge openings 23a and second gas discharge openings 23b twelve in total, inclusive of four first gas discharge openings 23a which have already been open. Thus, as shown in FIG. 6 (A), gas generating agent 61 burns in a stable manner with the internal pressure in combustion chamber 60 being maintained in an appropriate high-pressure state and the internal pressure in combustion chamber 60 does not drop. As shown in FIG. 6 (B), expansion and development of the air bag can be maintained.

In a fourth stage after start of activation, as shown in FIG. 6 (A), the internal pressure in combustion chamber 60 reaches an internal pressure P3 at which twelve third gas discharge openings 23c highest in opening pressure among first gas discharge openings 23a, second gas discharge openings 23b, and third gas discharge openings 23c can open, and portions of sealing tape 24 covering twelve third gas discharge openings 23c are accordingly cleaved as shown in FIG. 5 (C) so that a gas is discharged through all open first gas discharge openings 23a, second gas discharge openings 23b, and third gas discharge openings 23c twenty-four in total, inclusive of first gas discharge openings 23a and second gas discharge openings 23b twelve in total which have already been open. Thus, as shown in FIG. 6 (A), gas generating agent 61 burns in a stable manner with the internal pressure in combustion chamber 60 being maintained in an appropriate high-pressure state. As shown in FIG. 6 (B), gas output high in a stable manner is obtained until gas generating agent 61 burns out, and consequently, sustained development of the air bag can be continued.

In a fifth stage after start of activation, output of the gas is stopped with gas generating agent 61 having burnt out, and thus activation of gas generator 1 ends and development of the air bag also ends.

FIGS. 6 (A) and 6 (B) show for comparison as a reference embodiment, also combustion characteristics at the time of activation in a low-temperature environment when a total opening area of a plurality of gas discharge openings is increased simply by increasing a size of some of the plurality of gas discharge openings with a geometrically similar shape of a precise circle being maintained in a conventional general gas generator. In the gas generator according to the reference embodiment, in a stage of increase in pressure in the space in the housing as a result of burning of the gas generating agent, the sealing tape is cleaved in unison. A considerable amount of gas is emitted in a burst through the gas discharge openings and consequently significant drop in increase in internal pressure occurs in particular in the low-temperature environment and desired combustion characteristics are not obtained.

As described above, by adopting the construction as in gas generator 1 in the present embodiment, a gas generator which achieves reduction in size and weight without impairing performance can be obtained.

Additionally, by shaping gas discharge opening 23 into an elongated hole, an actual opening area with gas discharge openings 23 being open can differ depending on a difference in ambient temperature (that is, in a low-temperature environment, a room-temperature environment, or a high-temperature environment), and burning of the gas generating agent can be promoted in particular in the low-temperature environment. Therefore, a difference in performance of gas output due to an ambient temperature can remarkably be lessened and a gas generator higher in performance than in the conventional example can be obtained. This aspect will be described below in detail.

Figure 7:
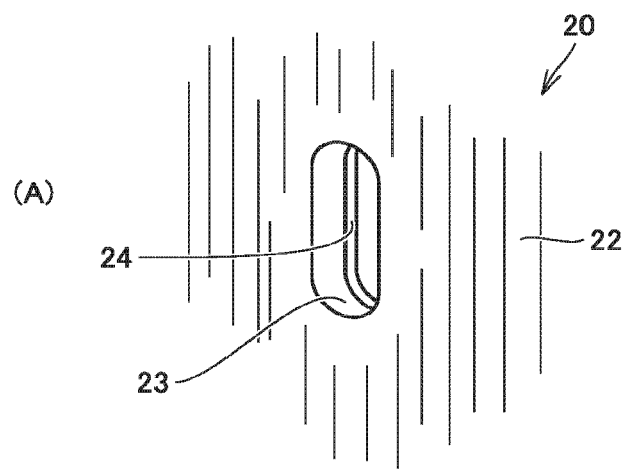
FIG. 7 schematically shows a state in the vicinity of a gas discharge opening when the gas generator in the embodiment of the present invention is activated.
Figure 7:
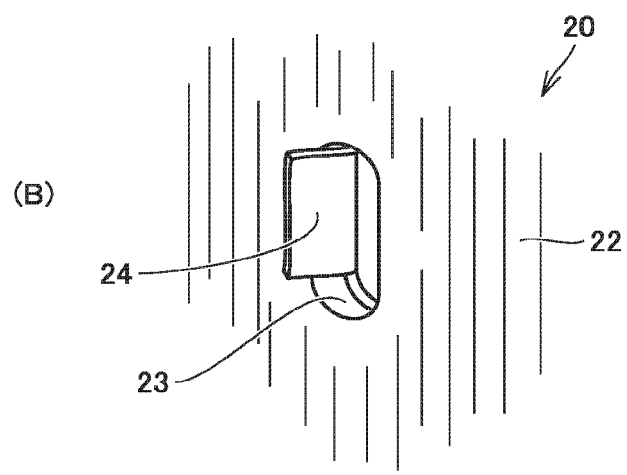

FIG. 7 is a diagram schematically showing a state in the vicinity of a gas discharge opening when the gas generator in the present embodiment is activated. FIG. 7 (A) shows an example in which the gas generator is activated in the room-temperature environment and in the high-temperature environment and FIG. 7 (B) shows an example in which the gas generator is activated in the low-temperature environment.

As shown in FIG. 7 (A), when gas generator 1 in the present embodiment is activated in the room-temperature environment and in the high-temperature environment, sealing tape 24 is completely broken along the opening edge portion of gas discharge opening 23 in a shape of an elongated hole in cleavage of sealing tape 24 in the portion closing gas discharge opening 23 with increase in internal pressure in combustion chamber 60, and broken sealing tape 24 does not adhere to the opening edge portion of gas discharge opening 23. Therefore, an opening area of gas discharge opening 23 and an actual opening area with gas discharge opening 23 being open as a result of cleavage of sealing tape 24 are equal to each other.

As shown in FIG. 7 (B), when gas generator 1 in the present embodiment is activated in the low-temperature environment, sealing tape 24 is broken along the opening edge portion of gas discharge opening 23 in a shape of an elongated hole in cleavage of sealing tape 24 in the portion closing gas discharge opening 23 with increase in internal pressure in combustion chamber 60, however, it is not completely broken along the entire periphery of the opening edge portion. The sealing tape is not broken along one of the pair of opening edge portions which extend in parallel along circumferential wall portion 22 and broken sealing tape 24 adheres to the opening edge portion of gas discharge opening 23. Therefore, an actual opening area with gas discharge opening 23 being open as a result of cleavage of sealing tape 24 is smaller than an opening area of gas discharge opening 23 by an amount corresponding to a cross-sectional area of sealing tape 24.

Therefore, the relatively large total sum of actual opening areas of gas discharge openings 23 at the time of activation of gas generator 1 is ensured in the room-temperature environment and in the high-temperature environment, whereas the total sum of actual opening areas of gas discharge openings 23 at the time of activation of gas generator 1 is relatively decreased in the low-temperature environment. Thus, an amount of the gas emitted through gas discharge openings 23 as a result of opening of gas discharge openings 23 in the low-temperature environment is restricted as compared with the amount in the room-temperature environment and in the high-temperature environment, and increase in internal pressure in combustion chamber 60 is accordingly promoted. Therefore, burning of gas generating agent 61 can be promoted in particular in the low-temperature environment, so that a difference in performance of gas output due to the ambient temperature can remarkably be lessened, and consequently, a gas generator higher in performance than in the conventional example can be obtained.

The reason why a difference as to whether or not a part of cleaved sealing tape 24 adheres to the opening edge portion of gas discharge opening 23 in accordance with an ambient temperature is caused by adopting the feature as in the present embodiment is exclusively estimated as follows. Since gas discharge opening 23 is in a shape of an elongated hole which is not an annular hole, a distance from the center of gas discharge opening 23 to the opening edge portion is not uniform. Then, instantaneous energy required to break sealing tape 24 at once along the opening edge portion increases. A rate of increase in internal pressure in combustion chamber 60 in the room-temperature environment and in the high-temperature environment is high, and hence instantaneous energy is obtained. On the other hand, a rate of increase in internal pressure in combustion chamber 60 is low in the low-temperature environment, and hence instantaneous energy is not obtained.

Though an example in which gas discharge opening 23 is provided as a track-shaped hole has been described by way of a typical example of the shape of the elongated hole in the present embodiment, the shape of gas discharge opening 23 is not limited thereto, but may be oval or rectangular. In order to more reliably obtain the effect described above, gas discharge opening 23 in the shape of the elongated hole preferably has a pair of opening edge portions which extend in parallel along circumferential wall portion 22 and it is further preferably provided as a hole in a track shape or a rectangular shape described above.

Though an example in which all of the plurality of gas discharge openings 23 are constructed into a shape of a longitudinally elongated hole has been described in the present embodiment, a considerable effect can be obtained also when only some of the plurality of gas discharge openings 23 are constructed into a shape of a longitudinally elongated hole, and an effect substantially the same as the effect described above can be obtained also when all or some of the plurality of gas discharge openings 23 are constructed into a shape of a laterally elongated hole. The shape of a laterally elongated hole refers to such a shape of an elongated hole that an opening width along the circumferential direction of circumferential wall portion 22 of upper shell 20 is greater than an opening width along the axial direction of circumferential wall portion 22.

Though an example in which the plurality of gas discharge openings 23 are arranged as being aligned along the circumferential direction of circumferential wall portion 22 of upper shell 20 has been described by way of example in the present embodiment, the gas discharge openings may be arranged in a plurality of rows or in another layout.

Opening pressures of the plurality of gas discharge openings are set differently from one another in three levels as described above in the present embodiment. When opening pressures of the plurality of gas discharge openings are set differently from one another in three or more levels, with the number of levels being set to n (n being an integer not smaller than three), a set ratio P1/Pn of an opening pressure P1 of gas discharge openings of the first level set to be lowest in opening pressure to an opening pressure Pn of gas discharge openings of the nth level set to be highest in opening pressure is preferably not lower than 0.4 and lower than 0.7, and respective set ratios P2/Pn, P3/Pn, . . . , and Pn−1/Pn of opening pressures P2 to Pn−1 of gas discharge openings of the second level to the n−1th level to opening pressure Pn of the gas discharge openings of the nth level set to be highest in opening pressure are preferably not lower than 0.7 and not higher than 0.95.

With setting as such, desired combustion characteristics suitable for expansion of the air bag are obtained. If only one of the conditions is not satisfied, sustained increase in internal pressure in the combustion chamber is interfered and drop of increase in internal pressure in the combustion chamber described above may occur.

When opening pressures of the plurality of gas discharge openings are set differently from one another in n levels as described above, respective ratios of sums Sa1 to San of opening areas of the gas discharge openings of the first level to the nth level to total opening area SA of the plurality of gas discharge openings are preferably not lower than 0.7/n and not higher than 1.3/n.

With setting as such, desired combustion characteristics suitable for expansion of the air bag are obtained. If only one of the conditions is not satisfied, sustained increase in internal pressure in the combustion chamber is interfered and drop of increase in internal pressure in the combustion chamber described above may occur.

When opening pressures of the plurality of gas discharge openings 23 are set differently from one another in three levels in particular, a set ratio P1/P3 of opening pressure P1 of first gas discharge openings 23a which are gas discharge openings of the first level set to be lowest in opening pressure (see FIGS. 5 (A) and 6 (A)) to an opening pressure P3 of third gas discharge openings 23c which are gas discharge openings of the third level set to be highest in opening pressure (see FIGS. 5 (C) and 6 (A)) is preferably not lower than 0.5 and lower than 0.7, and a set ratio P2/P3 of an opening pressure P2 of second gas discharge openings 23b which are gas discharge openings of the second level set to be second lowest in opening pressure (see FIGS. 5 (B) and 6 (A)) to opening pressure P3 of third gas discharge openings 23c which are the gas discharge openings of the third level set to be highest in opening pressure (see FIGS. 5 (C) and 6 (A)) is preferably not lower than 0.75 and not higher than 0.95.

With setting as such, desired combustion characteristics suitable for expansion of the air bag are obtained. If only one of the conditions is not satisfied, sustained increase in internal pressure in combustion chamber 60 is interfered and drop of increase in internal pressure in combustion chamber 60 described above may occur.

When opening pressures of the plurality of gas discharge openings 23 are set differently from one another in three levels in particular as in the present embodiment, respective ratios of sums Sa1 to Sa3 of opening areas of gas discharge openings 23a to 23c of the first level to the third level to total opening area SA of the plurality of gas discharge openings 23 are preferably not lower than 0.23 and not higher than 0.44.

With setting as such, desired combustion characteristics suitable for expansion of the air bag are obtained. If only one of the conditions is not satisfied, sustained increase in internal pressure in combustion chamber 60 is interfered and drop of increase in internal pressure in combustion chamber 60 described above may occur.

(Verification Test)

Gas generators according to first to third examples different in specifications in accordance with the embodiment of the present invention described above are actually prototyped below and a verification test in which whether or not combustion characteristics in particular in a low-temperature environment are improved is verified will be described.

First Example

FIG. 8 shows a table of specifications of the gas generator according to the first example and results of measurement when the gas generator is activated.

As shown in FIG. 8, the gas generator according to the first example achieves an amount of gas generation of 2.0 [mol] and has a thickness T of the housing decreased to 1.2 [mm]. The gas generator according to the first example has thus a weight reduced to 320 [g].

Opening pressures of a plurality of gas discharge openings are set differently from one another in three levels and total opening area SA of the plurality of gas discharge openings is 115.55 [mm$^2$]. Details of first to third gas discharge openings 23a to 23c set in the three levels and details of the sealing tape are as shown in FIG. 8. In particular, set ratios P1/P3 and P2/P3 described previously are set to 0.68 and 0.91, respectively, and ratios Sa1/SA, Sa2/SA, and Sa3/SA described previously are set to 0.26, 0.41, and 0.33, respectively.

The gas generator according to the first example thus constructed was actually activated in the low-temperature environment and change over time in internal pressure in the combustion chamber at that time was checked. Then, it was confirmed that, in a stage of increase in internal pressure in the combustion chamber owing to burning of the gas generating agent, drop of the internal pressure was not observed and desired combustion characteristics were obtained. A maximum value of the internal pressure in the combustion chamber at that time was measured, and it was confirmed that the value was lowered to 15.0 [MPa].

Second Example

FIG. 9 shows a table of specifications of the gas generator according to the second example and results of measurement when the gas generator is activated.

As shown in FIG. 9, the gas generator according to the second example achieves an amount of gas generation of 1.2 [mol] and has a thickness T of the housing decreased to 1.2 [mm]. The gas generator according to the second example has thus a weight reduced to 220 [g].

Opening pressures of a plurality of gas discharge openings are set differently from one another in three levels and total opening area SA of the plurality of gas discharge openings is 80.64 [mm$^2$]. Details of first to third gas discharge openings 23a to 23c set in the three levels and details of the sealing tape are as shown in FIG. 9. In particular, set ratios P1/P3 and P2/P3 described previously are set to 0.63 and 0.83, respectively, and ratios Sa1/SA, Sa2/SA, and Sa3/SA described previously are set to 0.42, 0.28, and 0.29, respectively.

The gas generator according to the second example thus constructed was actually activated in the low-temperature environment and change over time in internal pressure in the combustion chamber at that time was checked. Then, it was confirmed that, in a stage of increase in internal pressure in the combustion chamber owing to burning of the gas generating agent, drop of the internal pressure was not observed and desired combustion characteristics were obtained. A maximum value of the internal pressure in the combustion chamber at that time was measured, and it was confirmed that the value was lowered to 14.5 [MPa].

Third Example

FIG. 10 shows a table of specifications of the gas generator according to the third example and results of measurement when the gas generator is activated.

As shown in FIG. 10, the gas generator according to the third example achieves an amount of gas generation of 1.2 [mol] and has a thickness T of the housing decreased to 1.2 [mm]. The gas generator according to the third example has thus a weight reduced to 220 [g].

Opening pressures of a plurality of gas discharge openings are set differently from one another in three levels and total opening area SA of the plurality of gas discharge openings is 80.47 [mm$^2$]. Details of first to third gas discharge openings 23a to 23c set in the three levels and details of the sealing tape are as shown in FIG. 10. In particular, set ratios P1/P3 and P2/P3 described previously are set to 0.60 and 0.81, respectively, and ratios Sa1/SA, Sa2/SA, and Sa3/SA described previously are set to 0.38, 0.33, and 0.29, respectively.

The gas generator according to the third example thus constructed was actually activated in the low-temperature environment and change over time in internal pressure in the combustion chamber at that time was checked. Then, it was confirmed that, in a stage of increase in internal pressure in the combustion chamber owing to burning of the gas generating agent, drop of the internal pressure was not observed and desired combustion characteristics were obtained. A maximum value of the internal pressure in the combustion chamber at that time was measured, and it was confirmed that the value was lowered to 14.5 [MPa].

It can be understood from results of the verification test described above that, with gas generator 1 in the embodiment of the present invention described above, reduction in size and weight of the gas generator can be achieved without impairing performance.

Though an example in which one sealing tape is used as a sealing tape for closing a plurality of gas discharge openings has been exemplified in the embodiment of the present invention described above, a plurality of sealing tapes may be used. In that case, gas discharge openings may be different in opening pressure from one another by applying, by layering, a sealing tape identical in thickness only to a specific gas discharge opening to close the same, closing respective specific gas discharge openings with sealing tapes different in thickness, or closing respective specific gas discharge openings with a plurality of sealing tapes different in material (that is, different in shear strength).

The number, a shape, a size, and a layout of gas discharge openings for each type thereof disclosed in the embodiment of the present invention described above or the number of set levels of opening pressures of the gas discharge openings can variously be modified without departing from the gist of the present invention.

Additionally, though an example in which the present invention is applied to what is called a disc type gas generator has been described by way of example in the embodiment of the present invention described above, applications of the present invention are not limited thereto and the present invention can also be applied, for example, to a cylinder type gas generator.

The low-temperature environment, the room-temperature environment, and the high-temperature environment described above refer to an environment at a temperature around −40 [° C.], an environment at a temperature around 20 [° C.], and an environment at a temperature around 85 [° C.], respectively.

The embodiment disclosed herein is thus illustrative and non-restrictive in every respect. The technical scope of the present invention is delimited by the terms of the claims and includes any modifications within the scope and meaning equivalent to the terms of the claims.

REFERENCE SIGNS LIST

1 gas generator; 10 lower shell; 11 bottom plate portion; 12 circumferential wall portion; 13 protruding cylindrical portion; 14 depression portion; 15 opening; 20 upper shell; 21 top plate portion; 22 circumferential wall portion; 23 gas discharge opening; 23a first gas discharge opening; 23b second gas discharge opening; 23c third gas discharge opening; 24 sealing tape; 25 gap; 30 holding portion; 31 inner cover portion; 32 outer cover portion; 33 coupling portion; 34 female connector portion; 40 igniter; 41 ignition portion; 42 terminal pin; 50 cup-shaped member; 51 top wall portion; 52 sidewall portion; 53 extension portion; 54 tip end portion; 55 enhancer chamber; 56 enhancer agent; 60 combustion chamber; 61 gas generating agent; 70 lower-side supporting member; 71 bottom portion; 72 abutment portion; 73 tip end portion; 80 upper-side supporting member; 81 bottom portion; 82 abutment portion; 85 cushion material; and 90 filter

The invention claimed is:

1. A gas generator comprising:
a housing having a cylindrical circumferential wall portion provided with a plurality of gas discharge openings and having one end portion and the other end portion in an axial direction of the circumferential wall portion closed;

a gas generating agent arranged in an accommodation space located in the housing;

an igniter assembled to the housing, for burning the gas generating agent; and a sealing tape which closes the plurality of gas discharge openings, each of the plurality of gas discharge openings being opened as a portion of the sealing tape which closes each of the plurality of gas discharge openings is cleaved with increase in pressure in the accommodation space as a result of burning of the gas generating agent, the plurality of gas discharge openings including gas discharge openings set to be different from one another in opening pressure expressed as F×t×C/S so as to be opened stepwise with increase in pressure in the accommodation space as a result of burning of the gas generating agent, where F represents shear strength of the sealing tape, t represents a thickness of the portion of the sealing tape which closes each of the plurality of gas discharge openings, C represents a circumferential length of each of the plurality of gas discharge openings, and S represents an opening area of each of the plurality of gas discharge openings, a condition of T≤1.8 [mm] and SA≥60 [mm$^2$] being satisfied, where T represents a thickness of a portion of the housing which defines the accommodation space and SA represents a total opening area of the plurality of gas discharge openings, at least one of the plurality of gas discharge openings being in a shape of an elongated hole different in opening width in directions orthogonal to each other, opening pressures of the plurality of gas discharge openings being set differently from one another in n (n being an integer not smaller than three) levels, a set ratio of an opening pressure P1 of gas discharge openings of a first level to an opening pressure Pn of gas discharge openings of an nth level being not lower than 0.4 and lower than 0.7 and respective set ratios of opening pressures P2 to Pn−1 of gas discharge openings of a second level to an n−1th level to the opening pressure Pn of the gas discharge openings of the nth level are not lower than 0.7 and not higher than 0.95, where P1, P2, . . . , and Pn sequentially represent an opening pressure of the gas discharge openings of the first level set to be lowest in opening pressure to an opening pressure of the gas discharge openings of the nth level set to be highest in opening pressure, and respective ratios of sums Sa1 to Sa2 of opening areas of the gas discharge openings from the first level to the second level to a total opening area SA of the plurality of gas discharge openings are not lower than 0.7/n and not higher than 1.3/n, where Sa1, Sa2, . . . , and San sequentially represent a sum of opening areas of the gas discharge openings of the first level to a sum of opening areas of the gas discharge openings of the nth level among the plurality of gas discharge openings.

2. The gas generator according to claim 1, wherein all of the plurality of gas discharge openings are in the shape of the elongated hole different in opening width in the directions orthogonal to each other.

3. The gas generator according to claim 1, wherein the gas discharge opening in the shape of the elongated hole is in such a shape that an opening width along an axial direction of the circumferential wall portion is greater than an opening width along a circumferential direction of the circumferential wall portion.

4. The gas generator according to claim 1, wherein respective ratios of sums Sa3 to San of opening areas of the gas discharge openings from the third level to the nth level to a total opening area SA of the plurality of gas discharge openings are not lower than 0.7/n and not higher than 1.3/n.

5. The gas generator according to claim 1, wherein the plurality of gas discharge openings are provided as being aligned along a circumferential direction of the circumferential wall portion.

6. A gas generator comprising:

a housing having a cylindrical circumferential wall portion provided with a plurality of gas discharge openings and having one end portion and the other end portion in an axial direction of the circumferential wall portion closed;

a gas generating agent arranged in an accommodation space located in the housing;

an igniter assembled to the housing, for burning the gas generating agent; and a sealing tape which closes the plurality of gas discharge openings, each of the plurality of gas discharge openings being opened as a portion of the sealing tape which closes each of the plurality of gas discharge openings is cleaved with increase in pressure in the accommodation space as a result of burning of the gas generating agent, the plurality of gas discharge openings including gas discharge openings set to be different from one another in opening pressure expressed as F×t×C/S so as to be opened stepwise with increase in pressure in the accommodation space as a result of burning of the gas generating agent, where F represents shear strength of the sealing tape, t represents a thickness of the portion of the sealing tape which closes each of the plurality of gas discharge openings, C represents a circumferential length of each of the plurality of gas discharge openings, and S represents an opening area of each of the plurality of gas discharge openings, a condition of T≤1.8 [mm] and SA≥60 [mm$^2$] being satisfied, where T represents a thickness of a portion of the housing which defines the accommodation space and SA represents a total opening area of the plurality of gas discharge openings, at least one of the plurality of gas discharge openings being in a shape of an elongated hole different in opening width in directions orthogonal to each other, opening pressures of the plurality of gas discharge openings being set differently from one another in three levels, a set ratio of an opening pressure P1 of gas discharge openings of a first level to an opening pressure P3 of gas discharge openings of a third level being not lower than 0.5 and lower than 0.7 and a set ratio of an opening pressure P2 of gas discharge openings of a second level to the opening pressure P3 of the gas discharge openings of the third level being not lower than 0.75 and not higher than 0.95, where P1, P2, and P3 sequentially represent an opening pressure of the gas discharge openings of the first level set to be lowest in opening pressure to an opening pressure of the gas discharge openings of the third level set to be highest in opening pressure, and respective ratios of sums Sa1 to Sa2 of opening areas of the gas discharge openings from the first level to the second level to the total opening area SA of the plurality of gas discharge openings being not lower than 0.23 and not higher than 0.44, where Sa1, Sa2, and Sa3 sequentially represent a sum of opening areas of the gas discharge openings of the first level to a sum of opening areas of the gas discharge openings of the third level among the plurality of gas discharge openings.

7. The gas generator according to claim 6, wherein
a ratio of the sum Sa3 of opening areas of the gas discharge openings in the third level to the total opening area SA of the plurality of gas discharge openings is not lower than 0.23 and not higher than 0.44.

8. The gas generator according to claim 6, wherein
all of the plurality of gas discharge openings are in the shape of the elongated hole different in opening width in the directions orthogonal to each other.

9. The gas generator according to claim 6, wherein
the gas discharge opening in the shape of the elongated hole is in such a shape that an opening width along an axial direction of the circumferential wall portion is greater than an opening width along a circumferential direction of the circumferential wall portion.

10. The gas generator according to claim 6, wherein
the plurality of gas discharge openings are provided as being aligned along a circumferential direction of the circumferential wall portion.

\* \* \* \* \*